Nov. 16, 1954   O. H. JORDAN   2,694,805
PULSE RESPONSIVE DIRECTIONAL INDICATOR SYSTEM OR MECHANISM
Filed April 5, 1951   2 Sheets-Sheet 1

INVENTOR.
ORVAL H. JORDAN
BY
ATTORNEYS

Nov. 16, 1954          O. H. JORDAN          2,694,805

PULSE RESPONSIVE DIRECTIONAL INDICATOR SYSTEM OR MECHANISM

Filed April 5, 1951          2 Sheets-Sheet 2

*INVENTOR.*
ORVAL H. JORDAN
BY
Isler and Ornstein
ATTORNEYS

United States Patent Office 2,694,805
Patented Nov. 16, 1954

2,694,805

PULSE RESPONSIVE DIRECTIONAL INDICATOR SYSTEM OR MECHANISM

Orval H. Jordan, Cleveland, Ohio, assignor to Cornell-Dubilier Electric Corporation, South Plainfield, N. J., a corporation of Delaware Application April 5, 1951, Serial No. 219,459

3 Claims. (Cl. 340—379)

This invention relates to remote direction or position indicators, and more particularly to a direction or position indicator system or mechanism which is actuated by and responsive to electrical energy pulsations derived from a remote mechanical device.

The mechanism or system comprising this invention has application and utility in indicating the angularity or position of any remote movable device. It also finds application as a counting device for tabulating the cyclic movement of a remote moving device. However, for purpose of clarity and brevity, this disclosure will, in general, be limited to the application of my invention to a rotary antenna system such as is utilized at receiving stations.

It is a primary object of my invention to provide a position indicator which will show the angularity of a rotating device disposed at a location remote from the indicator.

Another object of my invention is to provide a position indicator of the character described which will accurately denote the relative angularity of a remote rotating device in either direction of its movement.

Still another object of my invention is to provide a position indicating system of the character described which is not limited in its operation to one cycle or 360° of movement.

A further object of my invention is to provide an accurate, yet simple, position indicator system in which the direction, position or relative angularity of a rotatable mechanical device is translated by means of electrical impulses to an electrically responsive indicating device.

Other objects and advantages of my invention will be apparent during the course of the following description. In the accompanying drawings forming a part of this specification and in which like numerals are employed to designate like parts through the same, Fig. 1 is a front elevation of an indicator device embodying the features of my invention.

Figure 1:
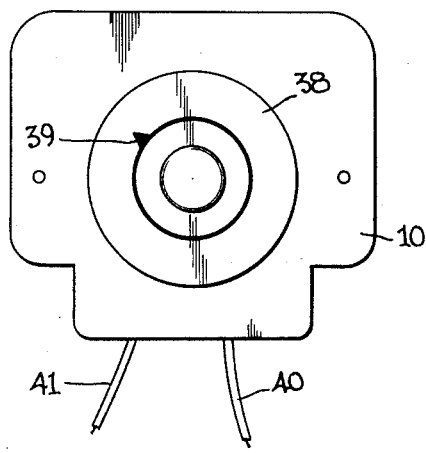
Figure 4:
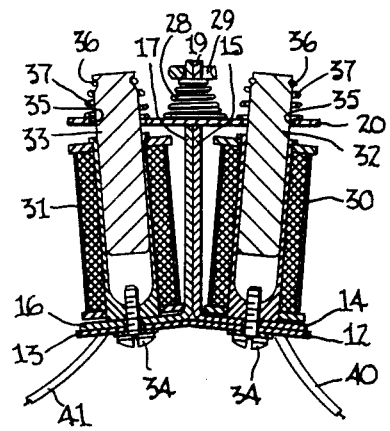
Fig. 4 is a vertical cross-sectional view taken on line 4—4 of Fig. 2.
Figure 3:
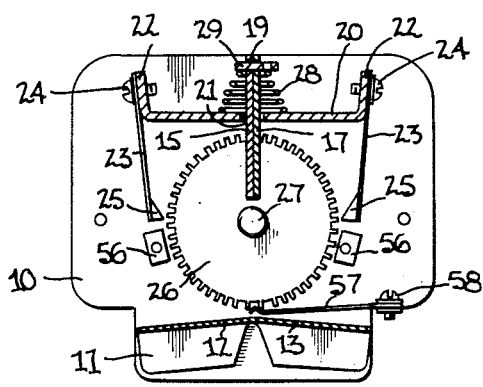
Fig. 3 is a vertical cross-sectional view taken on line 3—3 of Fig. 2.
Figure 2:
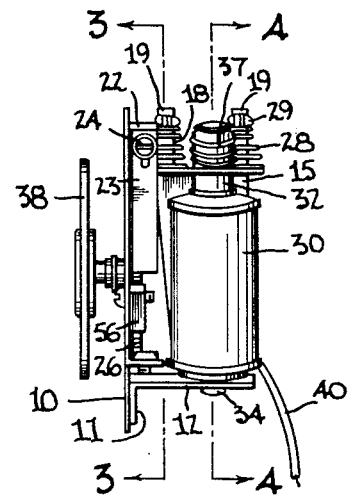
Fig. 2 is a side elevation of the device shown in Fig. 1.

Referring more particularly to Figs. 1–4 of the drawings, the indicator device is seen to include a mounting plate 10, which may be of metal, having secured thereto, as by welding, adjacent the bottom edge thereof, an angle 11 having symmetrical angularly inclined surfaces forming ledges 12 and 13 which extend normal to the rear face of the plate 10.

Secured in overlying relationship to the ledge 12 is an L-shaped metal member 14 having a vertical leg 15 which extends centrally of the plate 10 to a point approximately level with the top edge of the plate. A similar L-shaped member 16 having an upstanding leg 17 is secured to the ledge 13. The legs 15 and 17 are butted in back to back relationship and are recessed as at 18 to form two spaced posts 19.

A rocker plate 20, having spaced apertures 21 aligned with the posts 19, is mounted on the posts so as to be pivotally movable relatively to the legs 15—17 in a vertical plane. Portions of the plate are upturned to provide two ears 22 each of which serves as a mounting surface for a leaf spring 23, which is secured thereto as by a screw 24. Each leaf has secured to the free end thereof a pawl 25 which is adapted to engage a toothed wheel or gear 26 which is rotatably secured to the rear face of the plate 10 on a shaft 27.

The rocker 20 is maintained in a horizontal position by means of helical springs 28 which are mounted on the posts 19 and bear against the surface of the rocker plate. Cotter pins 29 which extend through the posts 19 serve to maintain the springs 28 in compression.

In the operation of the indicator device, as will be described more fully hereinafter, the rocker plate pivots either clockwise or counter-clockwise relatively to a horizontal axis defined by the posts 19. For effecting the aforesaid pivotal movement of the rocker plate, electromagnetic means are employed. These means may for example, take the form of a clapper or may, as illustrated in the drawings, comprise solenoids 30 and 31 having movable armatures or plungers 32 and 33, respectively. The solenoids are secured by screws 34 to the ledges 12 and 13 so as to be positioned below the rocker 20. The plungers 32 and 33 extend through suitably spaced apertures 35 in the rocker plate 20 and extend beyond the top of the rocker 20.

Each of the plungers is necked as at 36 so as to retain a coil spring 37 which bears against the upper surface of the rocker and thus serves to yieldably maintain the plunger 32 or 33 in elevated position above the plate 20.

The indicator device also includes a disk 38 which is suitably secured to the shaft 27 so as to rotate with the gear 26. The disk may have any suitable registration markings thereon; in this instance it being shown as an arrow marking 39 which is imprinted on the disk.

Figure 5:
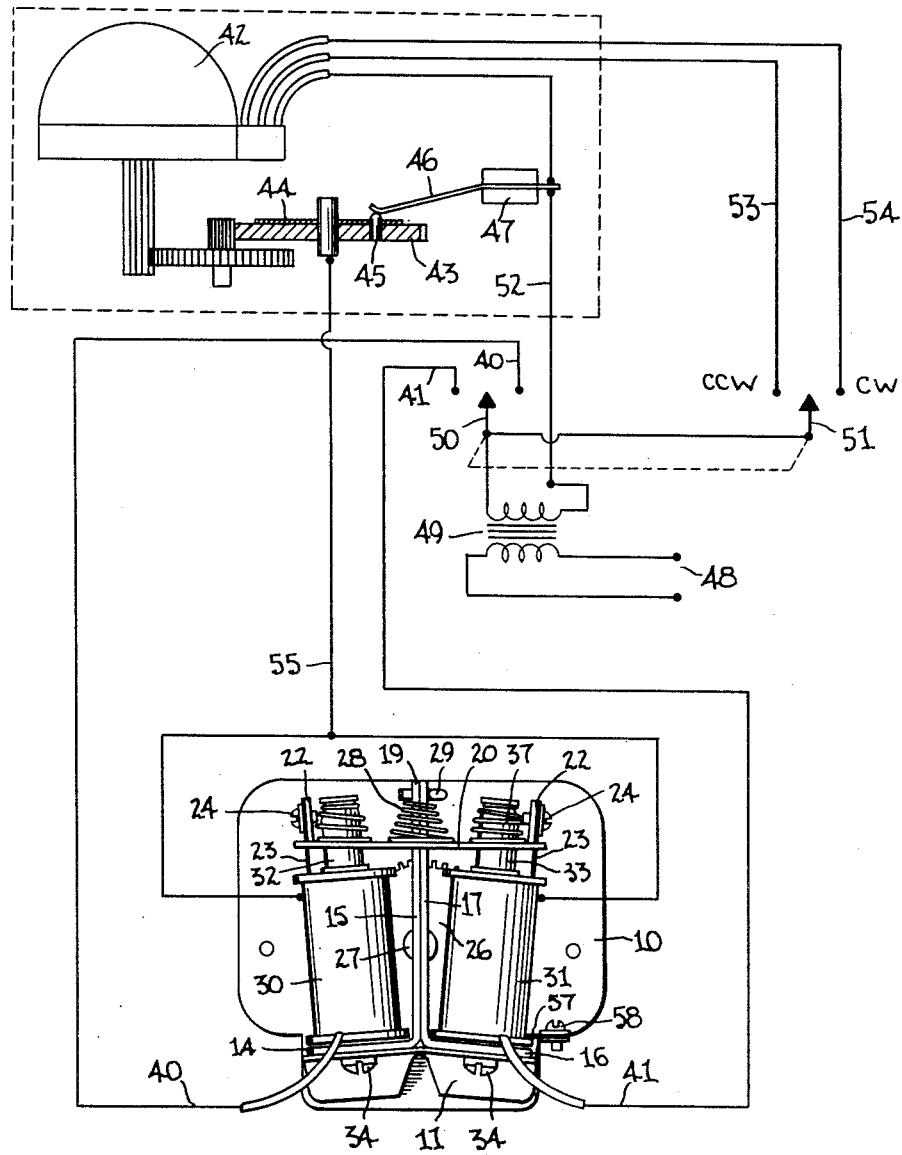
Fig. 5 is a rear elevation of the device shown in Fig. 1 and also showing diagrammatically the electrical system.

The coils of the solenoids 30 and 31 are so arranged that one end of each of the coils is electrically connected or grounded to the mounting plate 10 as indicated in Fig. 5. The other end of each of the solenoid coils terminate in external leads 40 and 41, respectively.

It will be understood that the indicator device, as above described, may, and usually will be encased or mounted in a suitable decorative casing (not shown) which will bear any desired indicia.

Referring now more particularly to Fig. 5 of the drawings, I have illustrated somewhat diagrammatically a system which illustrates a manner in which the indicator device of my invention may be utilized.

The reference numeral 42 indicates a motor driven rotating device of the type which is utilized to rotate an antenna to obtain maximum signal strength for, for example, television receiving sets.

The rotating device 42 includes a gear train of which one gear 43 is provided with a facing 44 of electrical insulating material. The gear 43 has secured therein a pin 45 of electro-conductive material which has a rounded end which projects through the insulation 44 to a point above the face of the gear.

Associated with the gear 43 is a resilient contact element or leaf spring 46 which is retained in a block 47. The contact element 46 has wiping engagement with the insulator facing 44 of the gear and the element 46 is also so disposed that it is in the path of movement of the pin 45 as it moves circularly during rotation of the gear 43.

The reference numeral 48 indicates connections to a source of A. C. power which energizes a transformer 49. Ganged switches 50 and 51 are connected to one lead of the secondary of the transformer 49 and the other lead of the transformer is connected to the contact element 46.

The rotator motor 42 is reversible and has three leads 52, 53 and 54. The lead 52 is connected to the secondary of the transformer. The switch 51 serves to close the motor circuit either through conductor 53 or conductor 54. The circuit through conductor 53 induces counter-clockwise (CCW) rotation in motor 42 and the circuit through conductor 54 induces clockwise (CW) rotation in the motor.

The double-throw switch 50 energizes the solenoid 30 through the conductor 40 and energizes the solenoid 31 through conductor 41. As will hereinafter more fully appear, the circuit through lead 40 will cause clockwise rotation of the gear 26 and the disk 38, and the circuit through lead 41 will cause counter-clockwise rotation of the same.

A conductor 55, which has electrical connection with the pin 45, completes the solenoid circuit.

The operation of the indicator system and mechanism will now be described.

When the ganged switches 50 and 51 are thrown to the left as viewed in Fig. 5, the rotator motor is energized to turn the rotator in a counterclockwise direction. Upon each complete rotation of the gear 43, the leaf spring 46 makes a momentary contact with the pin 45 to complete the circuit through solenoid 31. This pulsation or momentary energization of the solenoid 31 causes the plunger 33 to be retracted abruptly, and through the medium of spring 37 tilts the rocker 20 to the right or clockwise as viewed in Fig. 5. The pawl 25 mounted on the rocker is thus caused to engage the gear 26 to cause rotation thereof. Stops 56, which are secured to the plate 10, serve to arrest movement of the pawl after a movement of the gear equivalent to one tooth. The gear 26 thus rotates through a small angle in a clockwise direction as viewed in Figs. 3 or 5, and this movement is translated into a corresponding clockwise movement of the disk 38 as viewed in Fig. 1.

It will be understood that the number of teeth provided on gear 26 is determined by consideration of the nature of the results desired. Thus, if it is desired that the gear be in exact synchronism with the rate of rotation of the rotator 42, then the number of teeth on gear 26 will be the equivalent of the ratio of gear 43 to the rotator 42. If, for example, gear 43 rotates at the rate of 50 revolutions for each revolution of the rotator, then a fifty tooth gear 26 would reflect 1/50 of a turn for each complete revolution of the gear 43.

On the other hand, if the gear 43 rotated only 5 times for each complete revolution of the rotator, then a fifty tooth gear 26 would reflect 10 complete revolutions of the rotator for each complete revolution of the disk 38.

If the movement of the rotator is reversed by throwing the switches 50 and 51 to the clockwise position, then solenoid 30 will receive the momentary electrical impulse and thereby cause clockwise rotation of the disk 38 in the manner above described.

A leaf spring detent arm 57 is secured by a screw 58 to the plate 10 and yieldably engages gear 26 to restrain its movement.

Thus it will be apparent that the indicator mechanism will accurately reflect either directly or proportionally the rotative movement in either direction of the remote mechanical unit 42. By selecting suitable indicia such as compass points, or degrees of angle, or units of revolution, the angular position or direction of the remote mechanical unit is accurately transmitted.

It is to be understood that the form of my invention, herewith shown and described, is to be taken as a preferred example of the same, and that various changes in the shape, size and arrangement of parts may be resorted to without departing from the spirit of my invention or the scope of the subjoined claims.

Having thus described my invention, I claim:

1. Means for indicating the relative angularity of a remote rotatable device, consisting of a rotatable index element, a toothed wheel connected to said element, a pivotally movable pawl assembly having diametrically opposed pawls alternately engageable with said toothed wheel in response to predetermined pivotal movement of said pawl assembly in either of two directions, a pair of spaced solenoids each having a movable plunger traversing said pawl assembly, spring means connecting each plunger to diametrically opposed portions of said pawl assembly for yieldably securing each plunger to said pawl assembly to selectively effect rotation thereof in either of two directions, and means for energizing said solenoids.

2. A step-by-step electromagnetic indicator operative in either of two directions, consisting of a toothed rotatable index element, mechanical means engageable with said element to effect rotation thereof, and electromagnetic means coupled with said mechanical means to effect operative engagement of said mechanical means with said element in response to intermittent pulsations of electrical energy, wherein said mechanical means comprises a pivotally movable pawl assembly having diametrically opposed pawls engageable with said toothed element, and means yieldably maintaining said pawl assembly in nonengaged position, and said electromagnetic means comprises a pair of solenoids mounted on diametrically opposite sides of said toothed element, each solenoid having a movable plunger traversing a diametrically opposed portion of said pawl assembly, and spring means connected to each plunger and to said pawl assembly for yieldably securing said pawl assembly to said plungers.

3. An indicator as defined in claim 2 wherein said pawl assembly consists of a rocker pivotally secured to said indicator, helical springs biasing said rocker to a neutral position, and diametrically opposed pawls secured to the ends of said rocker and movable into and out of engagement with said toothed element in response to pivotal movement of said rocker.

References Cited in the file of this patent
UNITED STATES PATENTS

| Number | Name | Date |
|---|---|---|
| 1,110,418 | Burnett | Sept. 15, 1914 |
| 1,473,485 | Little | Nov. 6, 1923 |
| 2,299,498 | Rubinstein et al. | Oct. 20, 1942 |
| 2,377,583 | Smith | June 5, 1945 |